US012118234B1

(12) United States Patent
Geist et al.

(10) Patent No.: US 12,118,234 B1
(45) Date of Patent: Oct. 15, 2024

(54) SOLID STATE DATA RECORDER (SSDR) FOR USE WITH FORM-FACTOR AVIONICS SYSTEMS

(71) Applicant: United States of America as represented by the Administrator of NASA, Washington, DC (US)

(72) Inventors: Alessandro Geist, Bethesda, MD (US); Christopher Wilson, Greenbelt, MD (US); Cody Brewer, Bowie, MD (US); Austin Lanham, Baltimore, MD (US); Nicholas Franconi, Austin, TX (US); Travis Wise, Ft. Washington, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 143 days.

(21) Appl. No.: 17/893,427

(22) Filed: Aug. 23, 2022

Related U.S. Application Data

(60) Provisional application No. 63/249,869, filed on Sep. 29, 2021.

(51) Int. Cl.
  *G06F 12/00* (2006.01)
  *G06F 3/06* (2006.01)
(52) U.S. Cl.
  CPC .......... *G06F 3/0655* (2013.01); *G06F 3/0604* (2013.01); *G06F 3/0679* (2013.01)
(58) Field of Classification Search
  CPC .... G06F 3/0655; G06F 3/0604; G06F 3/0679; G06F 12/00; G06F 12/02; G06F 12/0207; G06F 12/0223; G06F 12/023; G06F 12/06; G06F 12/0615; G06F 12/0623; G06F 13/16; G06F 13/1605; G06F 13/161; G11C 11/419; G11C 11/418; G11C 11/417; G11C 11/416; G11C 11/415; G11C 11/414; G11C 11/413; G11C 11/4125; G11C 11/412; G11C 11/4116; G11C 11/4113; G11C 11/411

See application file for complete search history.

(56) References Cited

U.S. PATENT DOCUMENTS

| | | | |
|---|---|---|---|
| 2011/0078498 A1* | 3/2011 | Flatley | G06F 11/1629 714/15 |
| 2017/0206031 A1* | 7/2017 | Yin | G06F 1/3275 |
| 2018/0285192 A1* | 10/2018 | Merl | G06F 11/0736 |

OTHER PUBLICATIONS

DMicrosoft Computer Dictionary, p. 438 (Year: 2002).*

* cited by examiner

*Primary Examiner* — Arvind Talukdar
(74) *Attorney, Agent, or Firm* — Heather Goo; Matthew F. Johnston; Trenton J. Roche

(57) ABSTRACT

The present invention relates to a single-board solid state data recorder (SSDR) card configured for use in a 1U CubeSat payload form-factor multi-purpose architecture, which includes: a field programmable gate array (FPGA): a plurality of NAND storage banks of non-volatile NAND Flash storage, the plurality of NAND storage banks which store operational data, each of which is controlled by a NAND Flash controller which controls the signaling of the plurality of NAND storage banks and reading and writing to the plurality of NAND storage banks; and a plurality of SpaceWire nodes and a plurality of multi-gigabit transceivers which command the SSDR card and read/write data to the SSDR card; wherein the plurality of NAND Flash memory banks is independently controlled and independently powered.

14 Claims, 3 Drawing Sheets

SOLID STATE DATA RECORDER (SSDR) FOR USE WITH FORM-FACTOR AVIONICS SYSTEMS

ORIGIN OF THE INVENTION

The invention described herein was at least in-part made by an employee of the United States Government and may be manufactured or used by or for the Government of the United States of America for governmental purposes without the payment of any royalties thereon or therefor.

BACKGROUND OF THE INVENTION

1. Field of the Invention

The present invention relates to a miniaturized (3.5 in.× 3.5 in.), high-reliability solid state data recorder (SSDR) card for small satellite (SmallSat), or CubeSat applications and instrument electronic boxes in varying harsh radiation environment orbits. The SSDR is used as a component of a small form-factor avionics architecture which allows space mission developers to mix-and-match 1U (10 cm×10 cm) CubeSat electronic slices to be assembled into payload packages for varying space mission-specific needs.

2. Description of the Related Art

Space missions and instrument proposals benefit from Small Sat architecture designs, especially those that include advantages in size, weight, and power (SWaP) and reliability advantages. Unfortunately, although industry has several data-recorder products for CubeSat applications, these designs either have poor performance for radiation effects, or do not provide the high-speed data rates necessary to sustain throughput on high-performance detectors and sensors.

With CubeSat and SmallSat mission proposals focused on low cost and miniaturization, and targeting harsher radiation environments, such as geostationary earth orbit (GEO), polar, as well as, lunar and planetary—and since industry CubeSat vendors do not currently supply components suitable for these environments—there is no existing commercial SSDR solution to meet these space mission needs in a 10 cm×10 cm form factor.

Further, due to volume/mass constraints of SmallSats and CubeSats, redundant memory systems are not always a viable option, and if the SSDR fails, that can lead to a precipitous drop in the volume of science data that can be collected and processed on-board during space flight. Additionally, the need for highly reliable storage is especially important for missions that do not assume nearby relays, and which would need to store data for extended durations.

Thus, current design proposals are sub-optimal by either conforming to commercial CubeSat designs which have low reliability and feature untested commercial components (e.g., secure digital (SD) card, computer hard drives), or include reliable flight-qualified options that are typically made in significantly larger form-factor sizes designed for different mission specifications, or they end up hampered with inefficiencies by the selection and repurposing of other designs.

Thus, an SSDR which is of high reliability, high-density, and small form factor, and which addresses a much-needed reduction of mass and power, and improved (high-speed) sampling storage for instruments, and which is designed for harsher radiation environments while still providing high density and throughput data storage in a miniaturized form factor that is important for SWaP constrained CubeSats and SmallSats, is desired.

SUMMARY OF THE INVENTION

The present invention relates to a miniaturized (3.5 in.× 3.5 in.), high-reliability solid state data recorder (SSDR) card for small satellite (SmallSat), or CubeSat applications and instrument electronic boxes in varying harsh radiation environment orbits. The SSDR is used as a component of a small form-factor avionics architecture which allows space mission developers to mix-and-match 1U (10 cm×10 cm) CubeSat electronic slices to be assembled into payload packages for varying space mission-specific needs.

In one embodiment, the SSDR is composed of a card assembly and field programmable gate array (FPGA) design that implements the memory and data controllers. The SSDR card design of the present invention features high read/write data rates and massive density 12 Terabits in a 10 cm×10 cm card to support high-throughput data rates for upcoming sensors and detectors on space missions.

In one embodiment, the assembled CubeSat/SmallSat system harnesses the benefits of the low SWaP-C(size, weight, power, and cost) form-factor architecture of CubeSats, while selecting components to meet high-performance requirements for processing and data transfer, and finally combines them with intelligent and novel design practices to improve reliability.

In one embodiment, in order to implement a high reliability for space missions (geostationary earth orbit (GEO), low earth orbit (LEO), polar, lunar, planetary, etc.), the CubeSat/SmallSat form factor system and the various cards used therein, use radiation-tolerant and radiation-hard qualified flight parts and commercial components while emphasizing a novel architecture synergizing the best capabilities of computer processing units (CPUs), digital signal processors (DSPs), and field programmable gate arrays (FPGAs). This division of tasks is conducted with extensive algorithm profiling and partitioning, matched with mission requirements, to best align computational stages with architecture components. This hybrid approach is realized through the SpaceCube family of data processors that have extensive flight heritage for several cards.

In one embodiment, the form-factor system architecture of the present invention, with standard-defined pinout configurations and mechanical and electrical specifications for 1U CubeSat cards, allows the backplane and mechanical enclosure to be easily extended. Since these cards adhere to the standard (System-on-Chip, power card, etc.), the form-factor system architecture of the present invention allows the flexibility to configure a payload from a common catalog of cards.

Thus, the present invention achieves a design that not only is affordable for varying space mission environments, but also provides the processing capabilities necessary for onboard computing in a wide range of systems.

In one embodiment, the CubeSat-sized form-factor design of the present invention includes multiple CubeSat slices which can meet the needs for a multitude of missions. These interchangeable designs form the structure that allows electronic 1U CubeSat processor cards to be heavily reused for other missions. This reusability allows for future designs to benefit from extensive heritage, as well as architecture customizations by a mix-and-match approach from a diverse collection of compatible cards. Targeting reusable design practices and components meets needs for science, commercial space and defense missions.

Accordingly, the CubeSat/SmallSat form-factor system of the present invention provides orders of magnitude increase in performance and capability over typical rad-hard processor-based systems, and significant advances over the previous generation of SpaceCube technology. The present invention also provides substantial improvements in onboard computing capability while maintaining a high degree of reliability and lowering relative power consumption and cost.

In one embodiment, a single-board solid state data recorder (SSDR) card configured for use in a 1U CubeSat payload form-factor multi-purpose architecture, includes: a field programmable gate array (FPGA); a plurality of NAND (NOT-AND) storage banks of non-volatile NAND flash storage, the plurality of NAND storage banks which store operational data, each of which is controlled by a NAND Flash controller which controls the signaling of the plurality of NAND storage banks and reading and writing to the plurality of NAND storage banks; and a plurality of Space-Wire nodes and a plurality of multi-gigabit transceivers which command the SSDR card and read and/or write data to the SSDR card; wherein the plurality of NAND Flash memory banks is independently controlled and independently powered.

In one embodiment, the single-board SSDR card further includes: a high-density, high-speed open-pin field array backplane connector which plugs into a backplane.

In one embodiment, the FPGA is radiation-tolerant or radiation-hardened.

In one embodiment, the single-board SSDR card further includes: a plurality of CCSDS depacketizers/packetizers which receive CCSDS packets from the plurality of SpaceWire nodes and converts the CCSDS packets into first Advanced High Performance Bus (AHB) transactions; and an Advanced Extensible Bus (AXI)-to-AHB bridge, which converts AXI transactions from the plurality of multi-gigabit transceivers into second AHB transactions.

In one embodiment, the single-board SSDR card further includes: a central memory interconnect which receives the first AHB transactions and the second AHB transactions; wherein the central memory interconnect manages memory interface and is configured for multiple external interface types; and wherein the central memory interconnect connects to a register file which includes all status information and control registers and connects to the plurality of NAND flash controllers and a static random access memory (SRAM) controller.

In one embodiment, the SRAM controller is connected to an external SRAM chip and used to buffer high-speed transactions between the plurality of high-speed multi-gigabit transceivers and the plurality of NAND flash controllers; and a plurality of SRAM memory buffers read and/or write data to sustain throughput rates.

In one embodiment, the FPGA implements data randomization schemes to prevent data corruption.

In one embodiment, the single-board SSDR card of claim 6, further includes: a plurality of Reed-Solomon cores which correct and detect errors in data stored in the plurality of NAND Flash storage banks.

In one embodiment, the central memory interconnect interfaces with the plurality of NAND Flash controllers utilizing a bridge AHB (CoreAHB)-to-Advanced Peripheral Bus (APB3).

In one embodiment, the single-board SSDR card further includes: a pair of scramblers which randomize incoming data from the central memory interconnect into the plurality of NAND Flash controllers of the plurality of NAND Flash storage banks to prevent errors in the plurality of NAND Flash storage banks.

In one embodiment, independent control of the plurality of NAND Flash storage banks allows selective population of each of the plurality of NAND Flash storage banks, thereby relatively lowering memory density and obtaining relatively reduced power.

In one embodiment, relatively lower power states of the SSDR can be achieved by only turning on one of the plurality of NAND Flash storage banks at a time, thus halving power requirements of the plurality of NAND Flash storage banks.

In one embodiment, the single-board SSDR card further includes: a plurality of radiation-hardened voltage regulators; and a 12-bit analog-to-digital converter (ADC) for housekeeping telemetry; wherein the ADC monitors temperatures and voltages to ensure the assembled single-board of the SSDR and its components do not exceed predetermined operating conditions; and a voltage supervisor which provides power on reset to the FPGA and implements proper power sequencing for the plurality of voltage regulators.

In one embodiment, a 1U CubeSat payload form-factor multi-purpose architecture, includes: a single-board SSDR card according to claim 1; a plurality of mission-specific processor cards; and a backplane having a plurality of slots for a plurality of processor cards, one of the plurality of slots which accommodates the single-board SSDR card; wherein the backplane routes signals to the plurality of processor cards, interchangeably disposed in any of the plurality of slots.

In one embodiment, the SSDR card is used for storage capacity.

Thus, has been outlined, some features consistent with the present invention in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawings includes exemplary embodiments of the disclosure and are not to be considered as limiting in scope.

DESCRIPTION OF THE INVENTION

Figure 1:
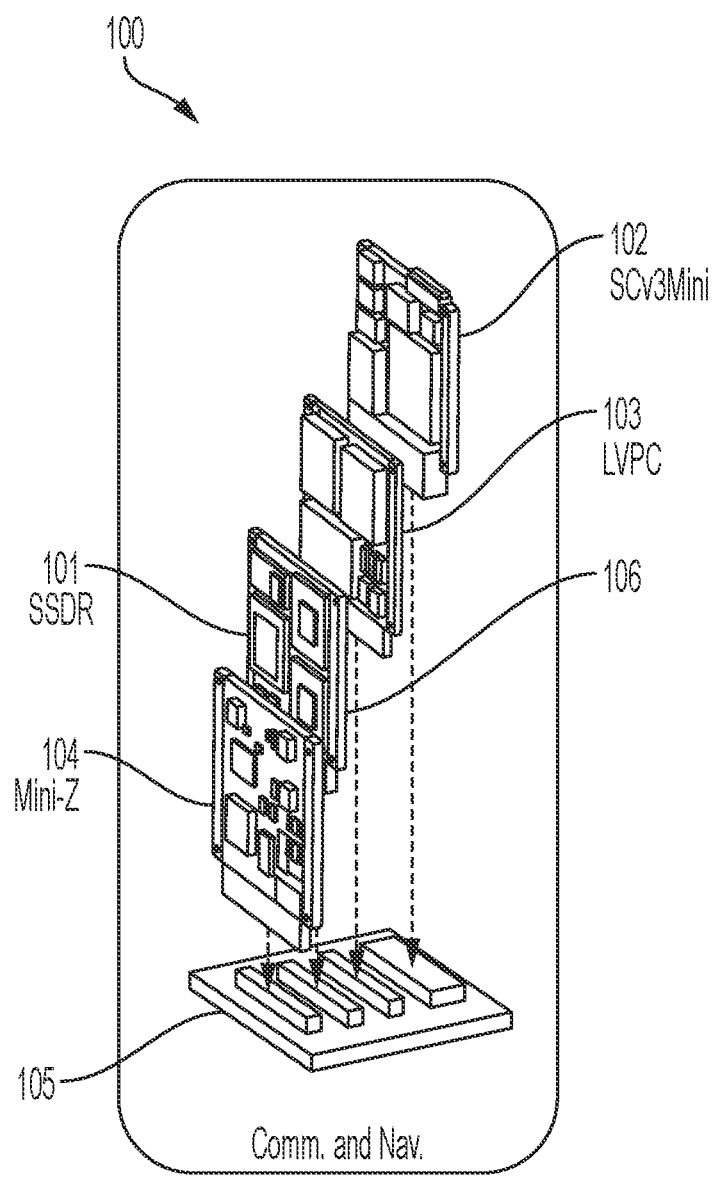
FIG. 1 is a schematic drawing of a CubeSat/SmallSat multi-purpose system which is a form factor design, into which the solid-state data recorder (SSDR) card of the present invention is inserted, according to one embodiment consistent with the present invention.

The present invention relates to a miniaturized (3.5 in.× 3.5 in.), high-reliability solid state data recorder (SSDR) card for small satellite (SmallSat), or CubeSat applications and instrument electronic boxes in varying harsh radiation environment orbits. The SSDR is used as a component of a small form-factor avionics architecture which allows space mission developers to mix-and-match 1U (10 cm×10 cm) CubeSat electronic slices to be assembled into payload packages for varying space mission-specific needs.

In one embodiment, the generic, form-factor system architecture 100 of the present invention includes a plurality of computer, single-board cards (e.g., cards 101-104), including the SSDR card 101 of the present invention, all of which adhere to a standard (i.e., single-board computers, power cards, routers, etc.), and disposed in an extendable mechanical enclosure (not shown), which allows a user the flexibility to mix-and-match an entire catalog of cards to configure the desired system 100.

In one embodiment, each of the computer cards 101-104 used in the system architecture 100 of the present invention, are typically sized at 9 cm×9 cm, typically weigh less than 0.5 lbs., and are low power (<20 Watts for typical applications), such that they can be used interchangeably in varying slotted configurations of the form-factor system architecture 100 to achieve mission requirements.

In one embodiment, the SSDR card 101, as well as the other cards 102-104, plug into the backplane 105 that routes signals to each of the standard card 101-104 slots. In one embodiment, instead of using a rigid-flex design, the backplane 105 favorably allows high-speed signals, such as the gigabits transceivers provided by the processor card 102, to be routed more easily to the other cards (for example, cards 101, 103-104). In one embodiment, the backplane 105 architecture is scalable and easily extended, and also allows cards 101-104 to be swapped out from the system architecture 100 during integration and testing, without the complexities and concerns of disassembling a stack of cards, that would have been required by past designs.

In one embodiment, as shown in FIG. 1, the single-board processor card 102 of the present invention is the NASA-designated "SpaceCube v3 Mini" processor card 102.

In one embodiment, a low voltage power converter (LVPC) 103 provides clean and isolated secondary voltages for the processor card 102 of the present invention, along with switched services for different voltages.

In yet another embodiment, an extension slot (not shown) can be used for a variety of standard cards which allow for specific mission requirements.

In one embodiment, in addition to the processor card 102 of the present invention, and LVPC card 103, another processor card, such as the NASA-designated "SpaceCube Mini-Z45" card 104, is included.

However, the configuration shown in FIG. 1 is just one the many examples of specific system architecture 100 configurations, where cards (i.e., cards 101-104, or other cards such as an GPS card, artificial intelligence (AI) card, etc.) may be easily interchanged for mission requirements.

In one embodiment, the SSDR 101—as shown interchangeably as SSDR card 101, 200—of the present invention is designed to be compatible with the CubeSat Card Specification (CS2)—compatible with the NASA-designated SpaceCube v3.0 Mini and MARES systems—in a 10 cm×10 cm 1U form factor, and includes a scalable, high density, high-reliability device for CubeSat/SmallSat applications or instrument electronic boxes. In one embodiment, the SSDR card 101 of the present invention has extensive storage capacity and can be used in varying harsh radiation environment orbits. The SSDR card 101 can be used in a variety of applications, including cyber security applications.

Figure 2:
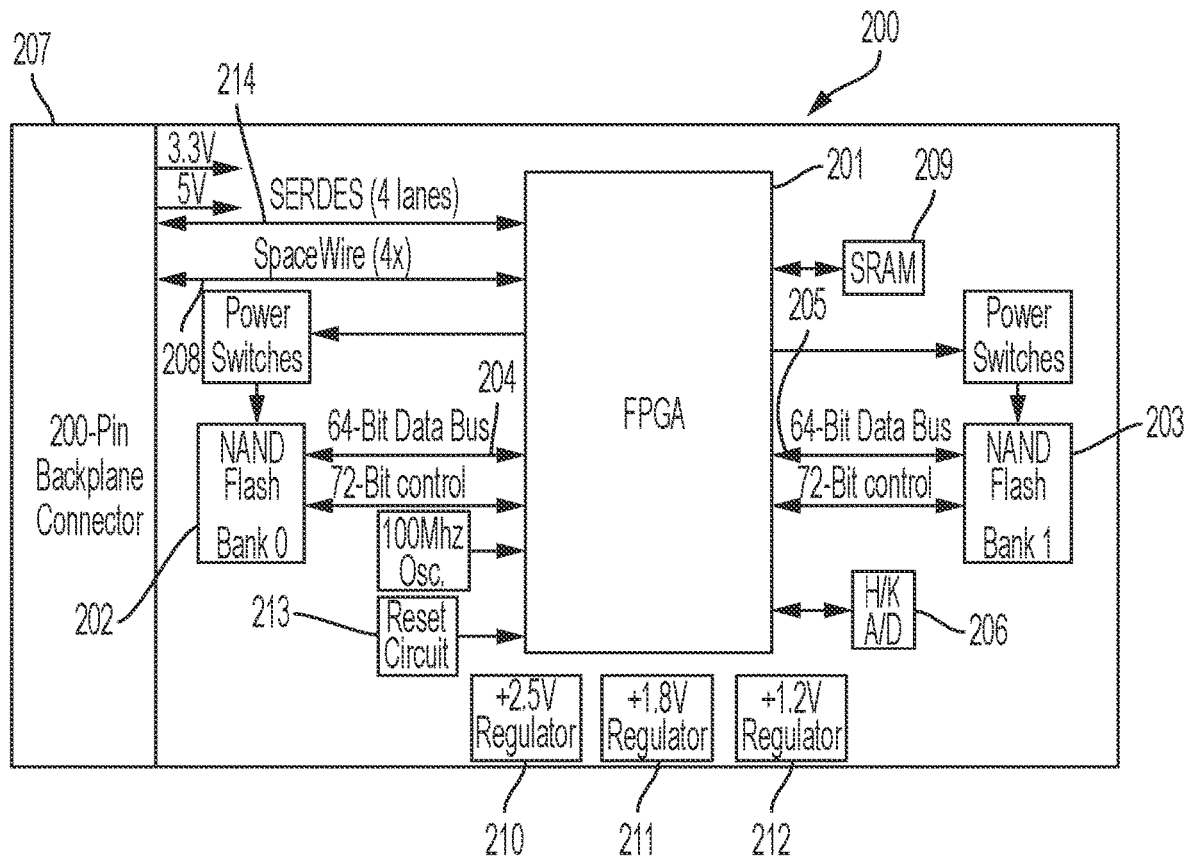
FIG. 2 is a block diagram of the layout of the SSDR card, according to one embodiment consistent with the present invention.

In one embodiment, as shown in FIG. 2, the SSDR card 200 features a 200-pin high-density backplane connector 207 (e.g., Samtec SEARAY backplane connector). In one embodiment, as shown in the block diagram of FIG. 2, the SSDR card 200 features radiation-tolerant or radiation-hardened (rad-hard) NASA-qualified flight parts such as a Microchip Technology's RTG4 field programmable gate array (FPGA) 201 that interfaces with two (2) banks of non-volatile NAND (NOT-AND) Flash storage (Bank 0, 202, and Bank 1, 203) to create an impressive array of data storage in the order of a 12 Tb capacity (1.5 Tbytes). These rad-hard parts allow the SSDR card 200 of the present invention to meet requirements of missions beyond LEO orbits, for reliability in harsh radiation environments.

In one embodiment, the rad-hard (RTG4) FPGA 201 is the backbone of the SSDR 200. In one embodiment, the FPGA 201 (see FPGA 300 in FIG. 3) includes a serializer/deserializer (SERDES) multi-gigabit transceiver 214, 301 and four SpaceWire nodes 208 (see also nodes 302, 303 in FIG. 3). These interfaces 214, 208, 301-303 are for commanding the SSDR card 200 and read/writing data to it.

In one embodiment, the SpaceWire ports 208, 302, 303 are available to interface with avionics platforms that do not support multi-gigabit transceiver rates. The multi-gigabit transceivers 214, 301 can be configured to support several industry standard protocols including peripheral component interconnect (express) (PCIe) and SpaceFibre which are implemented in the FPGA 201 fabric.

In one embodiment, the SpaceWire nodes 208, 302, 303 are to send CCSDS packets which are to be parsed and translated by CCSDS depacketizers/packetizers 304, 305 into AHB (Advanced High-performance Bus) transactions. In one embodiment, the multi-gigabit transceiver 214, 301 will also have its packets converted by an (Advanced Extensible Bus) AXI-to-AHB bridge 306 into a set of AHB transactions. In one embodiment, these transactions are memory mapped transactions that will communicate to a central memory interconnect CoreAHB 307.

In one embodiment, the central memory interconnect (CoreAHB) 307 will connect to the register file 308, a set of NAND flash controllers 309, 310, and a Static Random Access Memory (SRAM) controller 311. In one embodiment, the register file 308 is where all the status information, and control registers are stored. In one embodiment, the SRAM controller 311 is connected to an external SRAM chip 209 and used to buffer high-speed transactions between the high-speed transceivers 214, 301 and the NAND flash controllers 309, 310.

In one embodiment, the FPGA 201, 300 the high-speed SRAM memory 209 buffers read/write data to sustain high throughput rates. In one embodiment, the FPGA 201 also implements data randomization schemes to prevent data corruption and Reed-Solomon encoding/decoding by Reed-Solomon cores 314, 315 are used for Error Detection and Correction (EDAC) in data stored in the high density NAND Flash memory devices 202, 203, The Reed-Solomon cores 314, 315 are used to correct and detect errors in data stored in the NAND Flash devices 202, 203, that could be induced by particle strikes in the radiation environment.

In one embodiment, the central memory interconnect 307 also interfaces to the two NAND Flash controllers 309, 310—one for each NAND Flash bank 202, 203, via a bridge CoreAHB-to-APB3 (Advanced Peripheral Bus) 317. In one embodiment, these controllers 309, 310 handle the low-level signaling of the NAND Flash devices 202, 203 and are responsible for reading and writing to those NAND Flash devices 202, 203.

Figure 3:
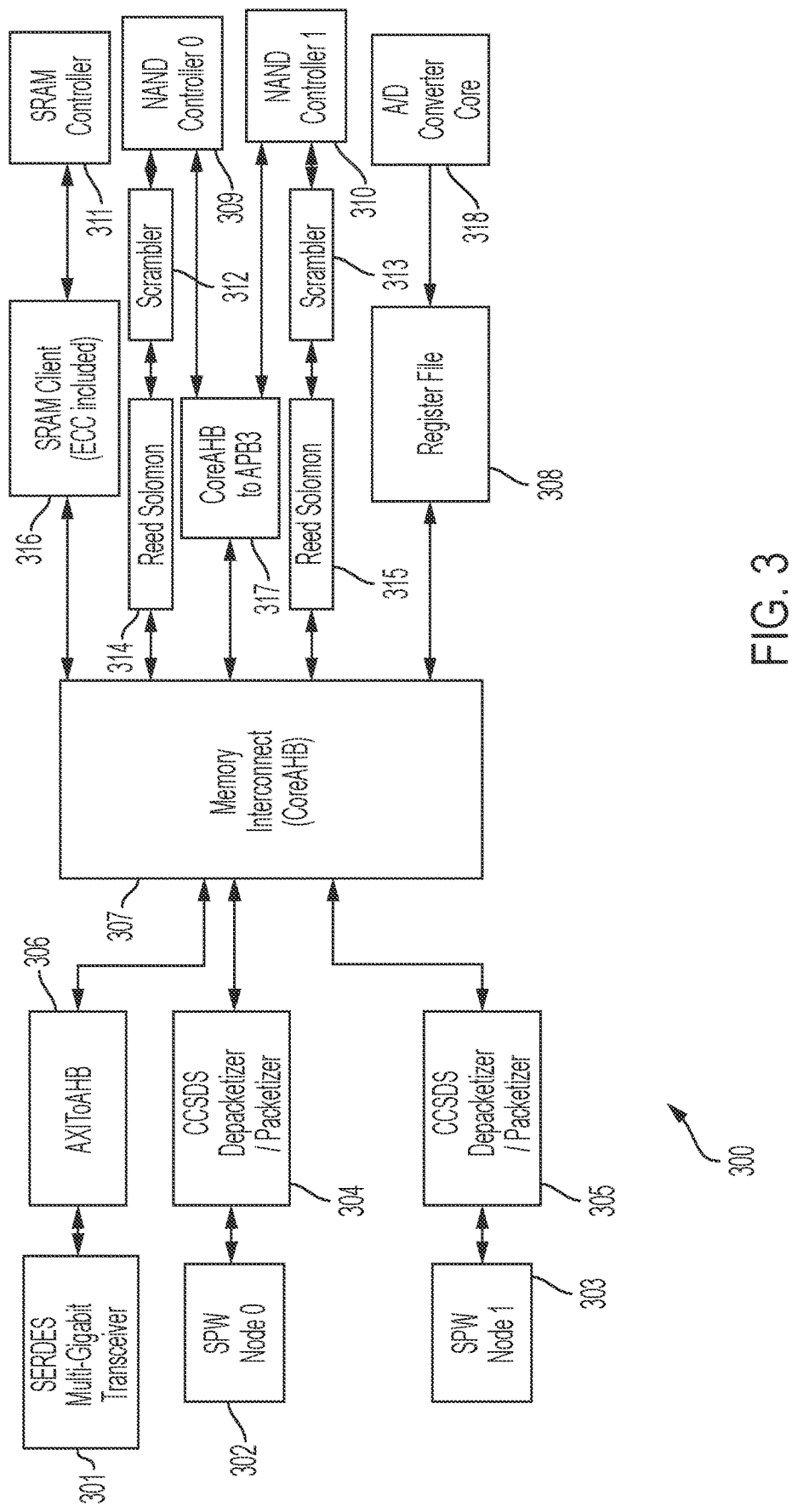
FIG. 3 is a block diagram of the SSDR field programmable gate array (FPGA), according to one embodiment consistent with the present invention.

In one embodiment, the block diagram of FIG. 3 shows several FPGA modules used to either prevent, detect, or correct errors, to maintain the integrity of the data stored in the non-volatile NAND Flash memory 202, 203 throughout mission operations. In one embodiment, the scramblers 312, 313 randomize incoming data from the central interconnect (CoreAHB) 307 into the NAND controllers 309, 310 of the NAND flash devices 202, 203. This feature is to prevent errors in the NAND Flash devices 202, 203 that may be caused by storing structured data patterns.

In one embodiment, the central memory interconnect (CoreAHB) 307 manages the memory interface (including ECC—see SRAM client 316) and allows for multiple external interface types.

In one embodiment, the SSDR card 200 also has independent power control of the NAND Flash memory banks 202, 203. In one embodiment, the NAND Flash devices 202, 203 are non-volatile memories that store important mission data on the SSDR 200. In one embodiment, to maximize data throughput, there are 4× NAND Flash modules (not shown) per bank 202, 203, each with a 16-bit data interface (not shown) to create the 64-bit wide data interface 204, 205. In one embodiment, the NAND modules are accessed in parallel within each bank 202, 203. In one embodiment, the NAND flash devices 202, 203 are placed back-to-back on the top and bottom of the printed circuit board (PCB) 106. This facilitates trace routing shared signals to each device 202, 204 and connecting to the power vias (not shown).

In one embodiment, the SSDR card 200 comprises both the Printed Circuit Board (PCB) assembly as well as the hardware description language (HDL) design that is hosted on the FPGA.

In one embodiment, to maximize flexibility, the two NAND Flash banks 202, 203 operate fully independently, and are independently powered. This design allows low power modes as well as the ability to mitigate single event functional interrupts (SEFIs) on a specific bank 202, 203 via power-cycle without affecting the other bank 202, 203.

In one embodiment, the SSDR card 200 allows selective population of the NAND Flash modules or allows the user to spare one bank 202, 203 for SWaP-C(size, weight, power, and cost) savings. In one embodiment, as noted above, for transferring data into and out of the SSDR card 200, the present invention supports multi-gigabit interfaces 214, 301 (using protocols such as serial rapid input/output (SRIO)), as well as medium-rate SpaceWire interfaces 208, 302, 303.

In one embodiment, the SSDR card 200 features high density (~12 Terabits) and sustained high data (memory) rates (400+MB/s write, >600 MB/s read).

In one embodiment, the SSDR card 200 also features radiation-hardened voltage regulators 210, 211, 212, and a 12-bit analog-to-digital converter (ADC) 206, 318 for housekeeping telemetry, the ADC 206, 318 which monitors temperatures and voltages to make sure the assembled board and its components do not exceed operating conditions.

In one embodiment, the SSDR card 200 features a voltage supervisor (see reset circuit 213) to provide power on reset to the FPGA 201 and to implement proper power sequencing for the various voltage regulators 210, 211, 212.

In one embodiment, the SSDR card 200 operates at 5-7 W with lower power "inactive" modes possible. Lower power states can be achieved by only turning on one NAND Flash bank 202, 203 at a time, thus halving the power required by the NAND Flash devices 202, 203. In addition, lower memory density can be traded for reduced power by not populating all the NAND Flash devices 202, 203 on the SSDR card 200.

The SSDR card 200 of the present invention is suitable for military and aerospace applications seeking a miniaturized, high performance system, and is ideal for CubeSats, Small-Sats, unmanned aerial vehicles (UAVs), sounding rockets, robotics, and exploration missions.

Further, the compatibility of the SSDR card in the designed form factor allows for a reconfigurable and reusable system where users can meet future science and defense needs for several mission types. The SSDR card is designed to be compatible with the CubeSat/SmallSat system, allowing more combinations of cards to be used to address new mission proposals. The present SSDR architecture design is advantageous for instruments that can be repurposed to varying science observables without significant changes to the electronics processing cards. The SSDR card for use in the design architecture provides high-performance processing, reliability, and the affordability of SWaP-C characteristics intrinsic with a 1U CubeSat form factor, and is immediately relevant for applications in instrument processing, artificial intelligence, communication and navigation, and finally cyber security and encryption.

In addition to providing high reliability, high density, with excellent storage capability, that is compatible with the CubeSat and SmallSat form factors, the SSDR includes built-in radiation features. Although the majority of commercial CubeSat/SmallSat processors are only designed for LEO orbit, with the SSDR card of the present invention being designed with high-reliability rad-hard components, it is capable of operating in harsher environments and supporting higher class missions than commercial, currently available market options. In particular, the core technology development can be deployed in a lunar orbit to provide a communications and navigations node as part of LunaNet, execute high-performance, finely tuned precision landing algorithms for lunar landers, and be additionally reconfigured to provide mobility guidance capabilities for lunar robots and rovers on the surface.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A single-board solid state data recorder (SSDR) card configured for use in a IU CubeSat payload form-factor multi-purpose architecture, comprising:
    a field programmable gate array (FPGA);
    a plurality of NAND (NOT-AND) storage banks of non-volatile NAND Flash storage, the plurality of NAND storage banks which store operational data, each of which is controlled by a NAND Flash controller which controls the signaling of the plurality of NAND storage banks and reading and writing to the plurality of NAND storage banks;
    a plurality of SpaceWire nodes and a plurality of multi-gigabit transceivers which command the SSDR card and read and/or write data to the SSDR card;
    a plurality of CCSDS depacketizers/packetizers which receive CCSDS packets from the plurality of Space Wire nodes and converts the CCSDS packets into first Advanced High Performance Bus (AHB) transactions; and
    an Advanced Extensible Bus (AXI)-to-AHB bridge, which converts AXI transactions from the plurality of multi-gigabit transceivers into second AHB transactions,
    wherein the plurality of NAND Flash memory banks is independently controlled and independently powered.

2. The single-board SSDR card of claim 1, further comprising:
    a high-density, high-speed open-pin field array backplane connector which plugs into a backplane.

3. The single-board SSDR card of claim 1, wherein the FPGA is radiation-tolerant or radiation-hardened.

4. The single-board SSDR card of claim 1, further comprising:
    a central memory interconnect which receives the first AHB transactions and the second AHB transactions;
    wherein the central memory interconnect manages memory interface and is configured for multiple external interface types; and
    wherein the central memory interconnect connects to a register file which includes all status information and control registers and connects to the plurality of NAND Flash controllers and a static random access memory (SRAM) controller.

5. The single-board SSDR card of claim 4, wherein the SRAM controller is connected to an external SRAM chip and used to buffer high-speed transactions between the plurality of highspeed multi-gigabit transceivers and the plurality of NAND Flash controllers; and
    wherein a plurality of SRAM memory buffers read and/or write data to sustain throughput rates.

6. The single-board SSDR card of claim 1, wherein the FPGA implements data randomization schemes to prevent data corruption.

7. The single-board SSDR card of claim 5, further comprising:
    a plurality of Reed-Solomon cores which correct and detect errors in data stored in the plurality of NAND Flash storage banks.

8. The single-board SSDR card of claim 7, wherein the central memory interconnect interfaces with the plurality of NAND Flash controllers utilizing a bridge AHB (CoreAHB)-to-Advanced Peripheral Bus (APB3).

9. The single-board SSDR card of claim 8, further comprising:
    a pair of scramblers which randomize incoming data from the central memory interconnect into the plurality of NAND Flash controllers of the plurality of NAND Flash storage banks to prevent errors in the plurality of NAND Flash storage banks.

10. The single-board SSDR card of claim 1, wherein independent control of the plurality of NAND flash storage banks allows selective population of each of the plurality of NAND flash storage banks, thereby relatively lowering memory density and obtaining relatively reduced power.

11. The single-board SSDR card of claim 10, wherein relatively lower power states of the SSDR can be achieved by only turning on one of the plurality of NAND Flash storage banks at a time, thus reducing power requirements of the plurality of NAND Flash storage banks.

12. The single-board SSDR card of claim 1, further comprising:
    a plurality of radiation-hardened voltage regulators; and
    a 12-bit analog-to-digital converter (ADC) for housekeeping telemetry;
    wherein the ADC monitors temperatures and voltages to ensure the assembled single-board of the SSDR and its components do not exceed predetermined operating conditions; and
    a voltage supervisor which provides power on reset to the FPGA and implements proper power sequencing for the plurality of voltage regulators.

13. A 1 U CubeSat payload form-factor multi-purpose architecture, comprising:
    a single-board SSDR card according to claim 1;
    a plurality of mission-specific processor cards; and
    a backplane having a plurality of slots for a plurality of processor cards, one of the plurality of slots which accommodates the single-board SSDR card;
    wherein the backplane routes signals to the plurality of processor cards, interchangeably disposed in any of the plurality of slots.

14. The multi-purpose architecture of claim 13, wherein the SSDR card is used for storage capacity.

* * * * *